July 16, 1940.　　　S. BUDLONG　　　2,208,153
POWER TRANSMISSION MECHANISM
Filed June 9, 1937　　　6 Sheets-Sheet 3
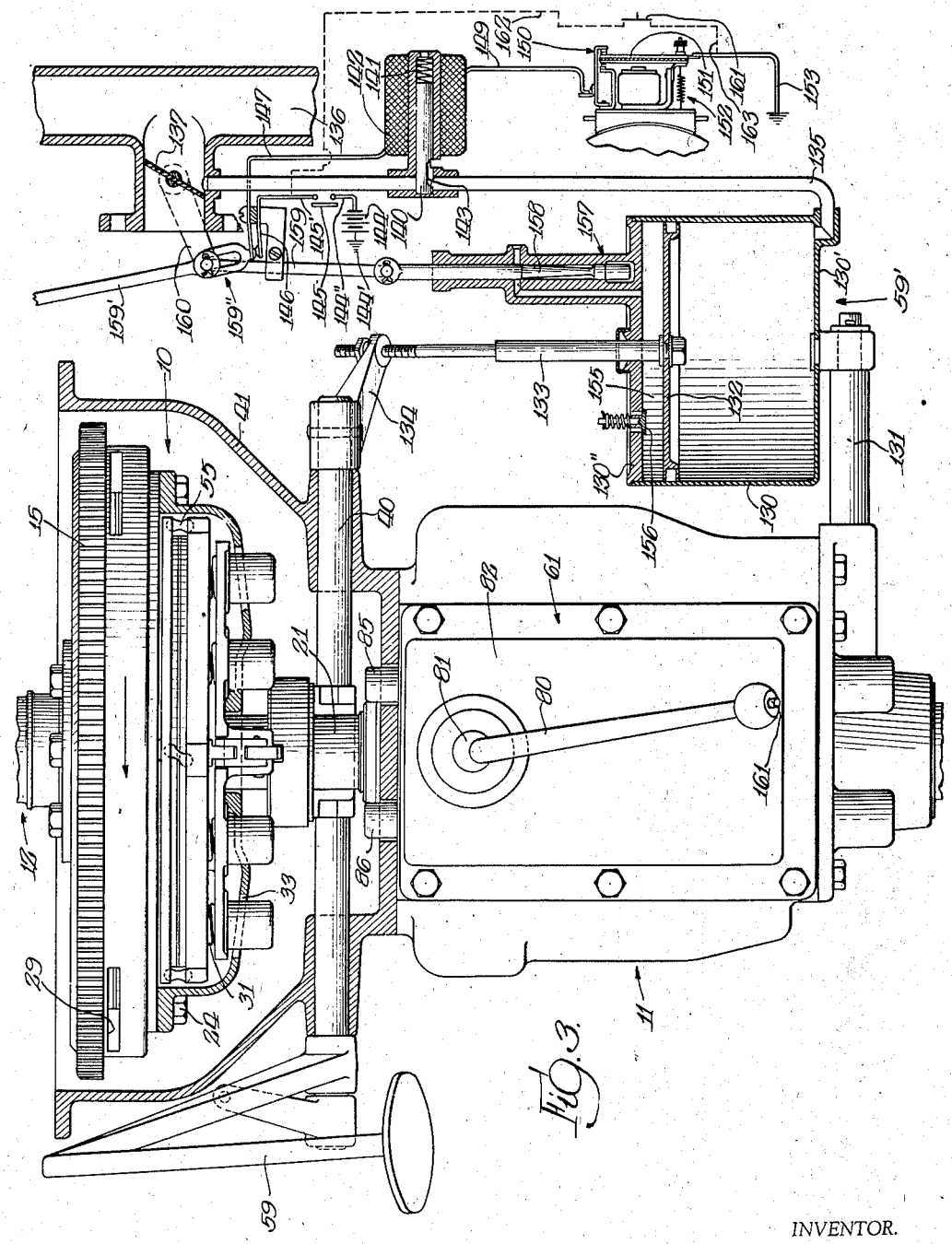
INVENTOR.
Simeon Budlong,
BY Ferd Bing
ATTORNEY.

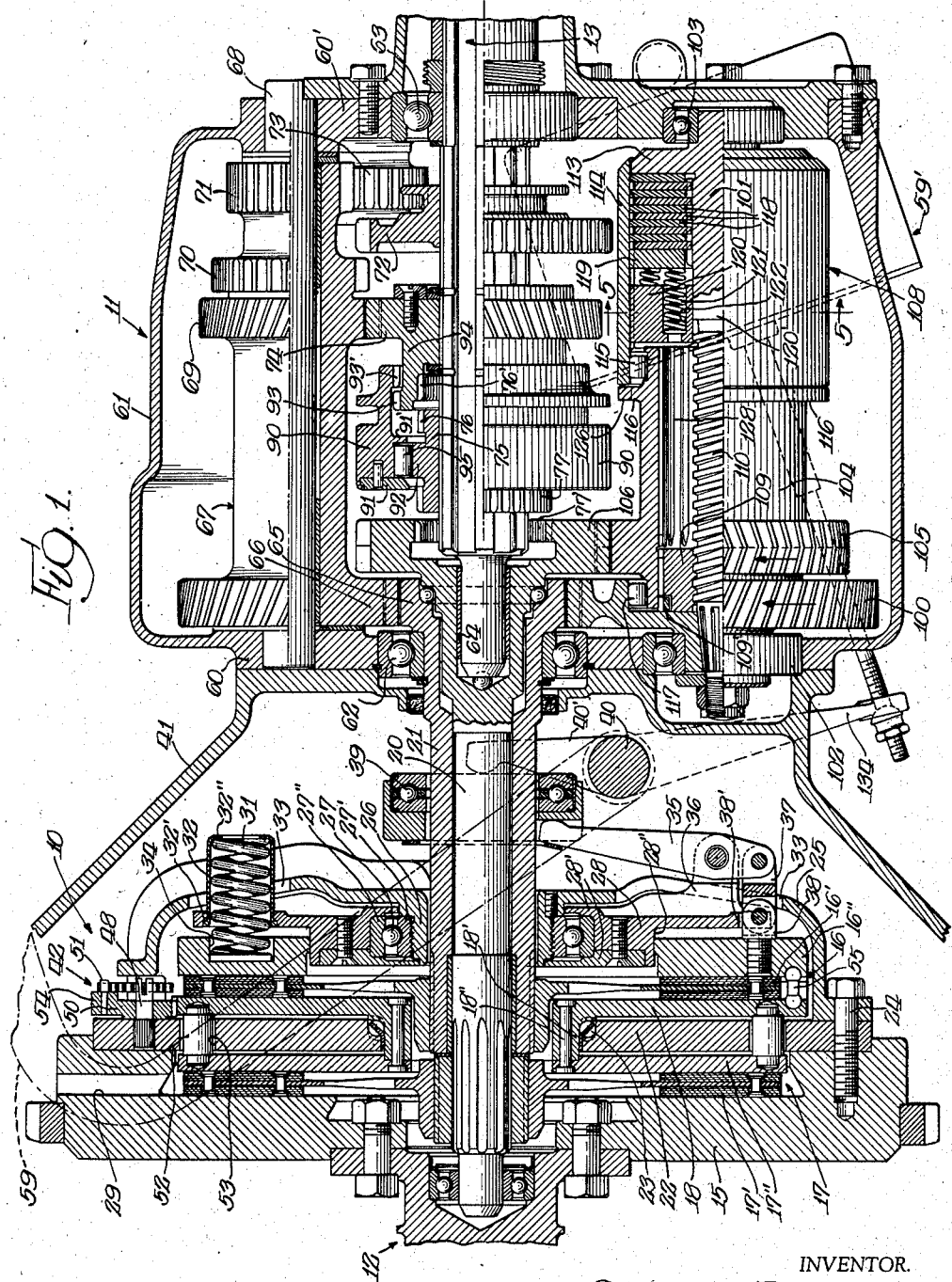

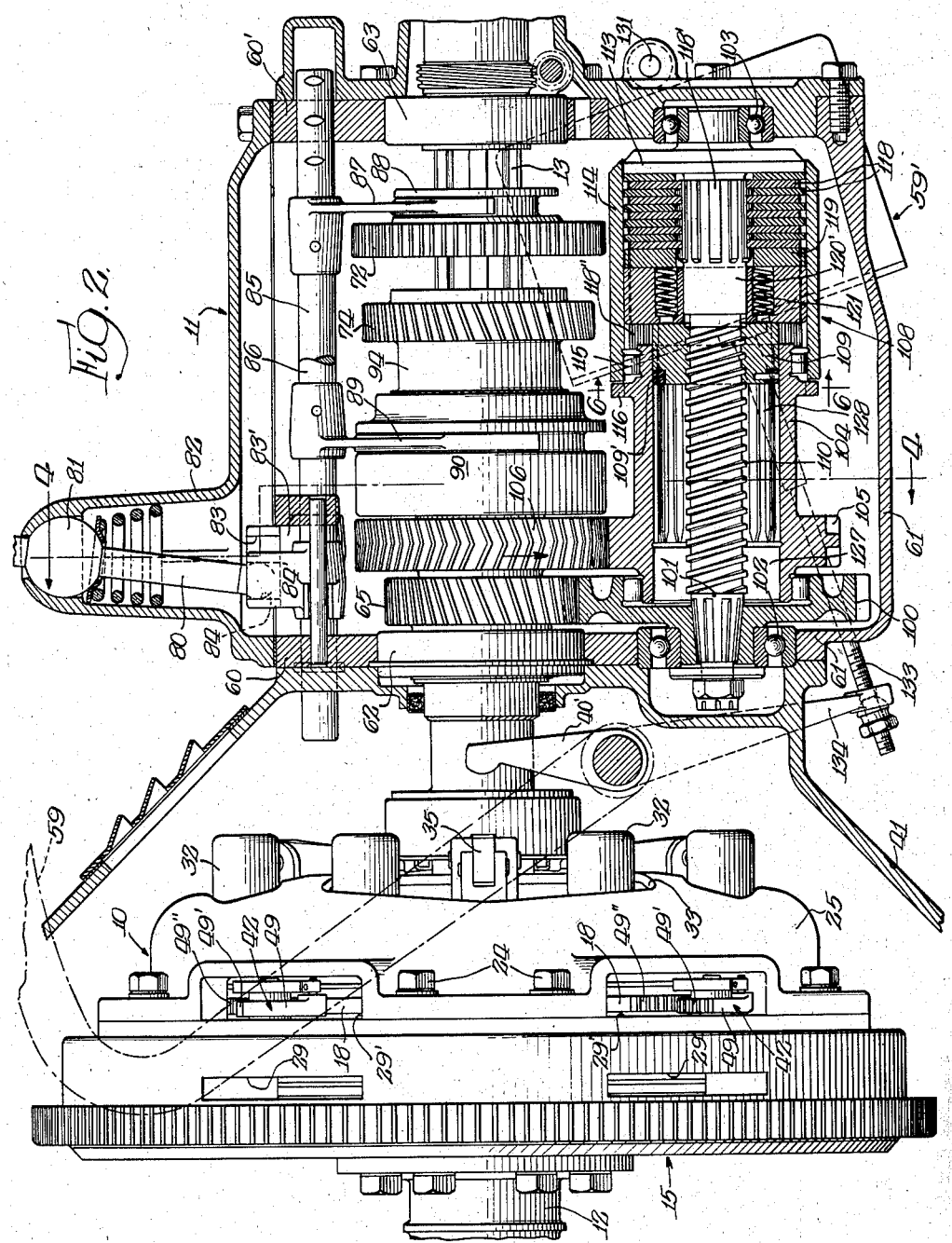

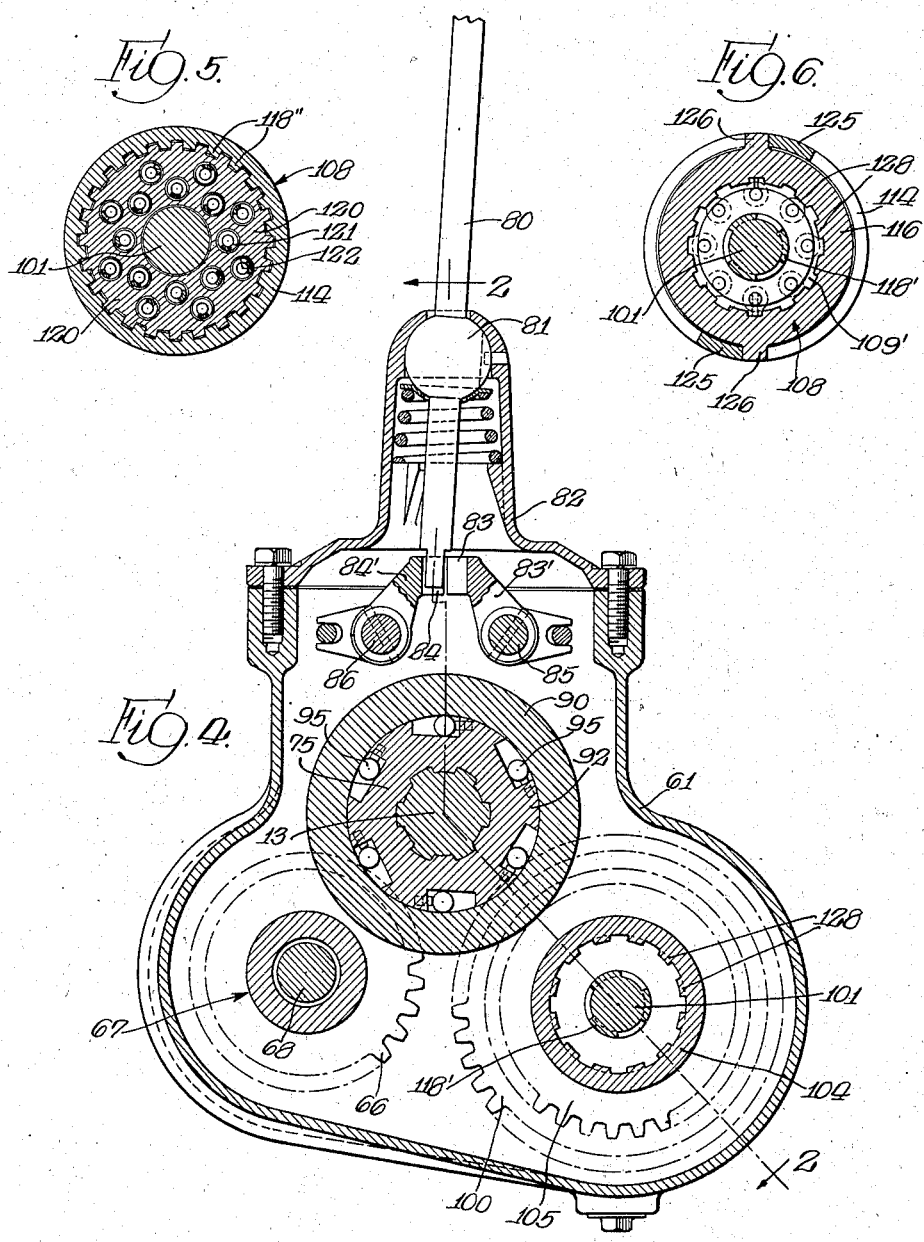

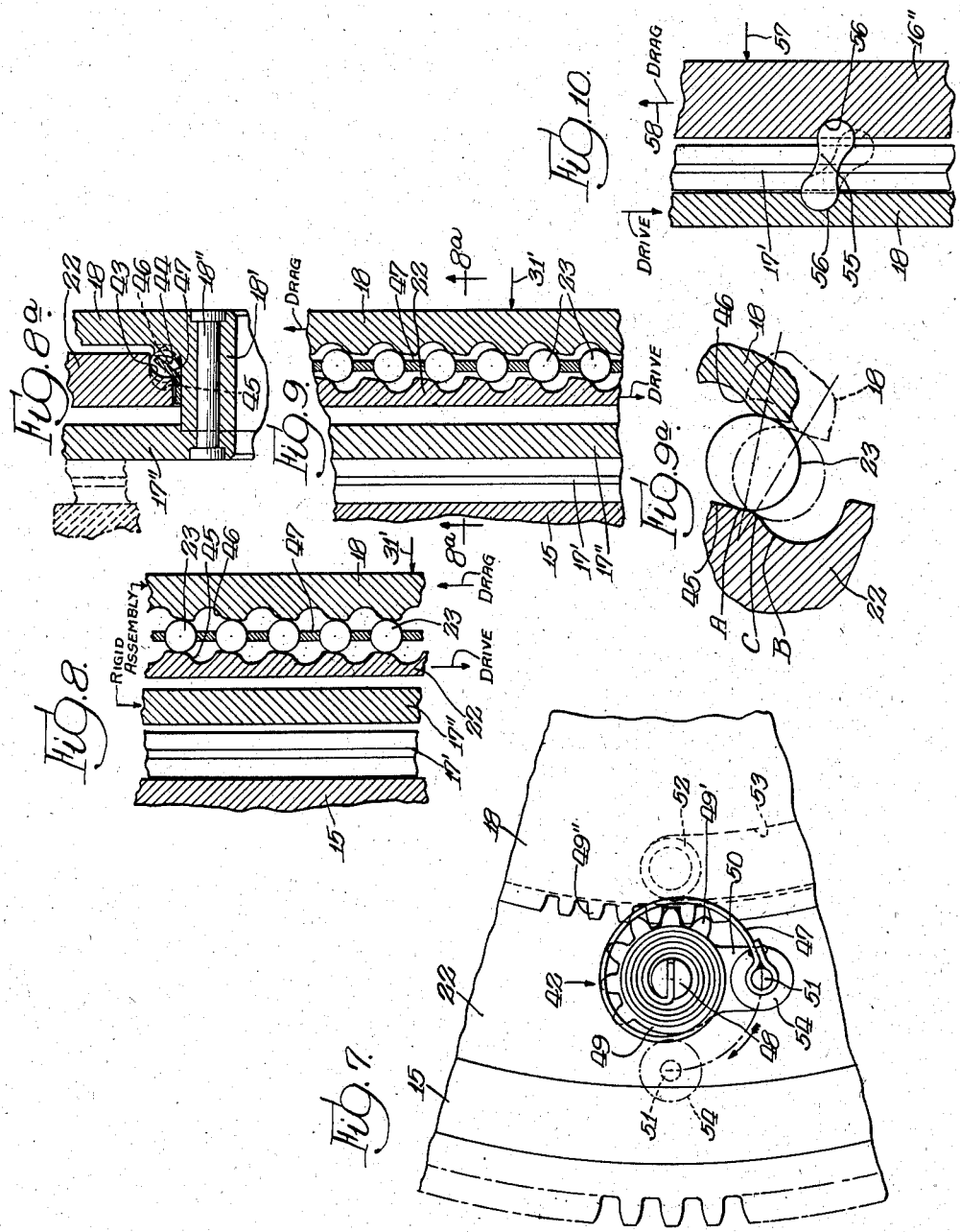

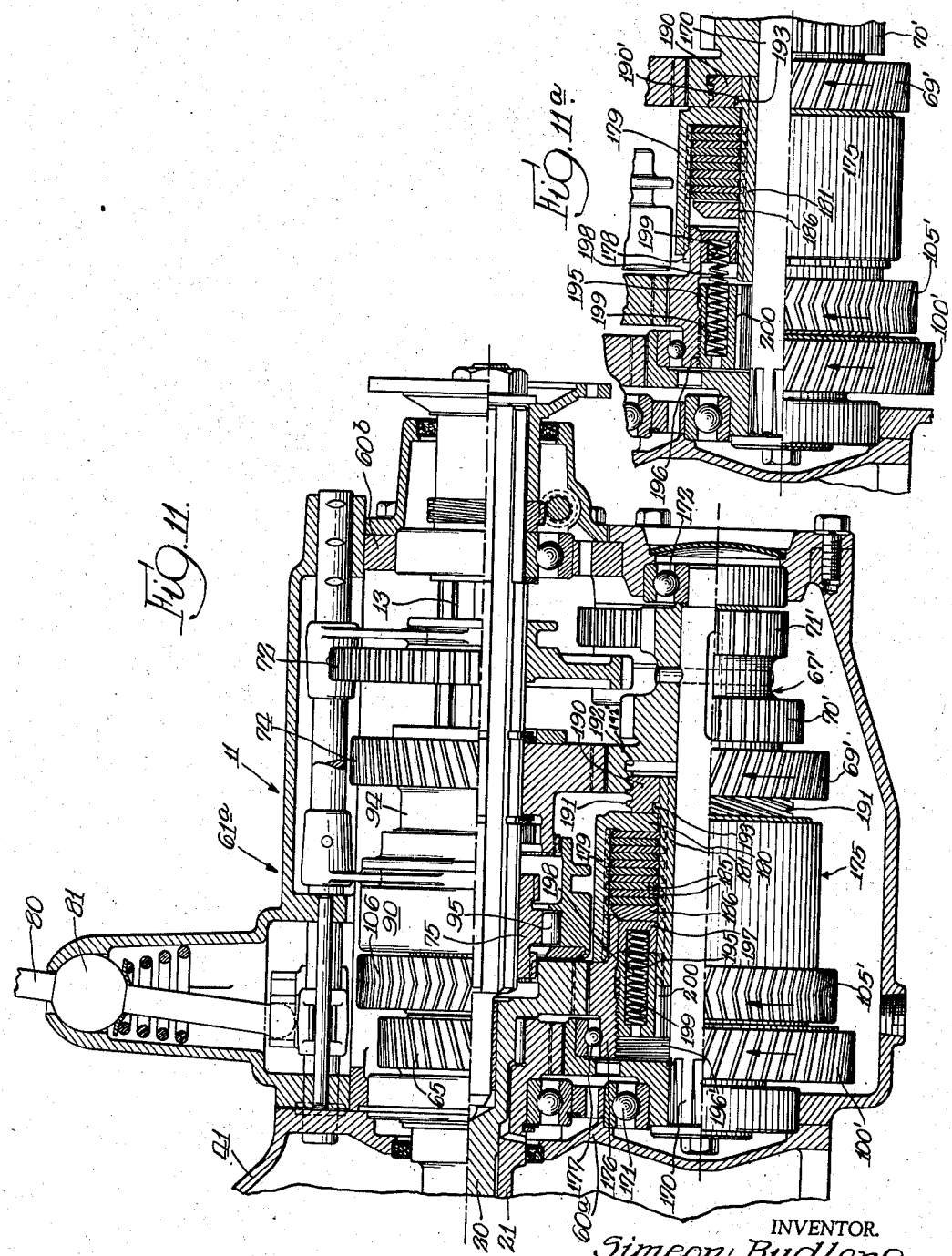

Patented July 16, 1940

2,208,153

UNITED STATES PATENT OFFICE 2,208,153

POWER TRANSMISSION MECHANISM

Simeon Budlong, Chicago, Ill., assignor to Centrimatic Transmission Co., a corporation of Illinois Application June 9, 1937, Serial No. 147,166

26 Claims. (Cl. 74—337)

The invention relates generally to variable speed power transmission mechanisms and more particularly to such transmissions which provide for automatic variation of the power transmission ratio.

Transmissions of this character find one wide field of utility in the power train of motor vehicles, in which use the requirements as to simplicity of operation, rapid and continuous acceleration capabilities, ruggedness and economy of construction, as well as smoothness, dependability and flexibility of performance are unusually exacting. With this situation in mind, an important object of the invention is to provide a new and improved transmission of this character wherein both speed and load conditions exercise an interrelated controlling action in governing the automatic variation of the transmission ratio.

Another object is to provide such a new and improved automatically variable transmission associated with an alternately operable manually selective transmission and having in combination therewith interrelated engine-speed and load responsive control means having the dual function of governing the transmission ratio in said automatic transmission and controlling the clutch operation when the manually selective transmission is utilized.

Another object is to provide such an automatically variable transmission wherein load, the distance travelled by the vehicle from a stopped position, as well as speed and acceleration conditions cooperate to govern the automatic functioning of the ratio-changing mechanism.

Another object of the invention is to provide a new, improved and simplified automatic transmission for automobiles wherein three transmission ratios are automatically operable in succession with the shift to high speed or direct drive controlled primarily in response to torque conditions.

Another object is to provide an automatic transmission for automobiles wherein a shift from one ratio to another is automatically effected during or at the end of a predetermined maximum travel of the vehicle in the lower ratio drive.

A further object is to provide an automatic transmission having a torque controlled shift into high, combined with a relatively low ratio starting gear which is automatically superseded, without appreciable torque drop, by an intermediate ratio accelerating gear after a predetermined travel of the vehicle.

Another object is to provide an automotive transmission wherein a conventionally operable manually selective change speed transmission is combined with an alternatively operable three speed automatically variable transmission.

Another object is to provide a new and improved three-speed automatic transmission wherein the three speeds are obtained through the use of but a single over-running clutch unit.

Another object is to provide a new and improved three-speed automatic transmission wherein the two shifts, from automatic low to automatic second and from automatic second to high, are effected while continuously applying driving power to the driven shaft, whereby to render the mechanism particularly efficient and adaptable to automotive requirements.

Another object is to provide a new and improved three-speed automatic transmission wherein functioning of the intermediate gearing is assured, whereby to avoid the usual objectionable tendency of such devices to skip the intermediate ratio.

Other objects and advantages will become apparent from the following description taken in connection with the accompanying drawings, in which:

Figure 1 is a modified or composite longitudinal sectional view of a transmission embodying the features of the invention in its preferred embodiment, the parts being illustrated with the gearing in neutral and the clutches in their closed positions assumed when the engine is stopped.

Figure 2 is a true sectional view taken along the line 2—2 of Fig. 4, with the gearing conditioned for automatic operation, and with the low speed clutch driving the output shaft through the "auto-second" drive, and with the high speed clutch open.

Fig. 3 is a plan view of the transmission shown in Figs. 1 and 2 illustrating a part of the clutch mechanism in section and embodying a diagrammatic illustration of the clutch control mechanism.

Fig. 4 is a vertical sectional view taken substantially along the line 4—4 of Fig. 2.

Figs. 5 and 6 are enlarged fragmentary sectional views taken along the lines 5—5 and 6—6 respectively of Figs. 1 and 2.

Fig. 7 is a fragmental view of a portion of the clutch control mechanism.

Fig. 8 is a fragmental sectional view illustrating the torque responsive control of the high speed clutch while in its open clutch position.

Fig. 8a is a fragmental sectional view of the torque responsive control of the high speed clutch, taken along the line 8a—8a of Fig. 9.

Fig. 9 is a view similar to Fig. 8 with the parts in their closed clutch position.

Fig. 9a is an enlarged view of a portion of the mechanism illustrated in Fig. 8.

Fig. 10 is a fragmental view showing the torque responsive control means of the low speed clutch with the clutch in its open position.

Fig. 11 is a fragmental view illustrating an alternative embodiment of the gearing mechanism of the device, with the parts engaged to effect drive in "auto-second" ratio.

Fig. 11a is a fragmental portion of Fig. 11 showing the parts of the synchronizer in their released positions.

While the invention is susceptible of embodiment in many different forms, I have shown in the drawings and will herein describe in detail two such embodiments with the understanding that the present disclosure is to be considered as an exemplification of the principles of the invention and is not intended to limit the invention to the particular embodiments shown. The scope of the invention will be pointed out in the appended claims.

The Mechanism—In General

In the embodiments chosen for illustration herein, the invention is embodied in an automatic transmission wherein an automatically controlled multi-speed clutch mechanism 10 and a manually controllable selective speed-change gearing mechanism 11 are interposed in power transmitting relation between a driving or engine crankshaft 12 and a co-axial driven shaft 13, which shaft 13 is, in the complete vehicle, connected in driving relation to the differential reduction gearing of the rear axle assembly.

The construction, arrangement and relationship of the clutch mechanism 10 and the gearing mechanism 11 are such that the vehicle may be driven in the conventional manner through manual selection of the gear ratio, or may at the will of the driver, be operated to obtain automatic variation through three successive graduated gear ratios.

The Multi-Speed Clutch Mechanism

The clutch mechanism 10, as herein illustrated, is associated with a fly wheel 15 which is bolted to the driving shaft 12, the clutch comprising a low speed clutch 16 and a high speed clutch 17 adapted for successive driving engagement. As shown in Fig. 1, the driven member of the high speed clutch 17 comprises a friction disk 17' splined on a shaft 20 coaxial with the driving shaft, and adapted for engagement on its opposite side surfaces with the fly wheel and a disk-like driving member 17" which rotates with the fly wheel and is shiftable longitudinally to engage the clutch 17. Similarly, the driven member of the low speed clutch comprises a friction disk 16' splined on a concentric sleeve 21 rearwardly of the side of the driving member 17", and engageable on its rear face by a low speed clutch driving member 16" which rotates with the fly wheel and is shiftable longitudinally to effect engagement of the clutch 16.

To serve as a backing means to engage the other or forward face of the friction disk 16", a disk-like backing plate 18 is provided, the disk 18 having an integral axial sleeve 18' thereon at its inner edge whereby it is connected to the pressure plate 17" in axially spaced relation. As shown in Fig. 1, the sleeve 18' abuts the inner border portion of the plate 17" and is held in fixed relation thereto by a plurality of rivets 18" passing through the sleeve wall and the plate 17". Thus the plates 17" and 18" constitute a unitary assembly through which clutch closing pressure may be applied through the clutch 16 to the high speed clutch 17.

In supporting the driving elements of the low and high speed clutches on the fly wheel, the several elements are preferably provided with supporting bearings spaced axially of the assembly, and to this end a supporting plate 22, bolted to the fly wheel 15, extends radially inwardly into the space between the plates 17" and 18 to support and center these two plates through ball bearings 23. The supporting plate 22 is fixed in position on the fly wheel 15 by a plurality of bolts 24 which also secure a clutch housing 25 in place to enclose the low speed clutch 16. Another point of support for the clutch driving elements is preferably provided on the clutch housing 25, and to this end the housing 25 has, at its inner periphery, an integral axial sleeve 26 which projects inwardly or forwardly and carries a ball bearing 27. The ball bearing 27 has its inner race 27' threaded and locked onto the sleeve 26, while its outer race 27" is clamped between opposed guard flanges 28' of a carrier plate 28. On the carrier plate 28 there is provided an annular bearing surface 28" which is slidably engaged by the inner peripheral surface of the pressure plate 16" so as to radially support the pressure plate 16" while permitting the axial shifting required to engage or disengage the clutches.

With the clutch elements assembled in this manner, any dirt or grit between the various disks and plates is thrown outwardly so as to avoid choking of the clutch assembly, and such dirt is discharged from the high speed clutch through radial ventilating slots 29 in the fly wheel (Figs. 1 to 3), while it is discharged from the low speed clutch through peripheral openings 29' in the housing 25 as shown in Fig. 2.

Upon the carrier plate 28 outwardly of the shoulder 28", a plurality of expansive coil springs 31 are mounted at peripherally spaced points within individual cup-like retainers 32. The spring housings or retainers 32 project forwardly through suitable openings in the carrier plate 28 and have flanges 32' thereon to prevent rearward withdrawal of the retainers. At their other or rear ends the retainers have inturned flanges 32" against which the rear ends of the springs 31 bear. It will be noted in Figs. 1 and 2 that the spring retainers 32 project rearwardly outside of the clutch housing 25 through openings 33 in the housing 25. At their forward ends the springs 31 are seated in confining recesses 34 in the pressure plate 16" so as to apply yielding clutch closing force thereto.

To oppose the springs 31 and provide for opening of the clutches, a plurality of radially positioned clutch release levers 35 are provided. The levers 35 are pivoted intermediate their ends on lugs 36 which project from the axially fixed carrier plate 28 and extend through the relatively large openings 33 in the clutch housing 25. At their outer ends the levers 35 are pivoted to links 37 which extend forwardly through the openings 33 and are pivoted at their forward ends to lugs 38 projecting longitudinally from the pressure plate 16". As shown in Fig. 1, the lugs 38 extend through peripheral notches 38' in the carrier plate 28 so that the parts are held in fixed rotative relation to the carrier 28 at all times. At their inner ends the levers 35 engage one race of a release bearing 39 which may be shifted forwardly to rock the levers 35 and withdraw the pressure plate 16". Actuation of the release bearing 39 is effected by an arm 40' carried by a transverse rock shaft 40 which is mounted in a bell housing 41 surrounding the upper portion of the clutch assembly.

It will be evident that clutch closing actuation of the pressure plate 16" by the springs 31 may be transmitted, after closure of the low speed clutch 16, to impart closing movement to the high speed clutch driving member 17", and as illustrated in Figs. 1, 2 and 7 of the drawings, means is provided to urge the high speed clutch to its open position when the pressure plate 16" is withdrawn so as to cause the high and low speed clutches to be opened successively during such withdrawal of the pressure plate. This means preferably comprises a plurality of spring mechanisms 42 located at peripherally spaced points about the edge of the plate 22 and acting between the plate 22 and the plate assembly 17"—18 to urge the plate 17" to its clutch opening or releasing position.

In the present instance these spring mechanisms 42, in exerting their clutch opening action upon the high speed clutch, make use of a torque responsive control means which operates to govern the engagement of the high speed clutch, and hence this torque responsive means will now be described as a basis for subsequent elaboration on the controlling function and operation of the spring mechanisms 42.

This torque responsive control means for the high speed clutch 17 is best illustrated in Figs. 1, 8, 8a, 9 and 9a, and it has as its object the prevention of the engagement of the high speed clutch during the existence of high torque conditions in the drive path, or in other words, the prevention of the engagement of the high speed clutch when engine conditions are such as to render the assumption of the load inefficient to direct drive. In accordance with the present invention this torque means is located relatively close to the axis of the clutch assembly so that the torque effective in the shafts of the mechanism is applied at substantially its maximum effectiveness or value to the torque responsive means. By providing for the application of a high degree of torque to the high speed clutch control means, the relative sensitivity of the controlling operation thereof is rendered inherently suitable at all times to the widely varying requirements of automotive use.

For example, when accelerating an automobile in a lower speed gearing, it is desirable to retain this lower speed gearing in operation so long as the vehicle speed is relatively low, and where, during low speed operation, the applied torque level in the control means is maintained at several times the operational threshold of said control means, this retention of the low ratio drive is assured despite relatively wide variations in the applied torque which may occur due to variations of accelerator positioning. As a result, the driver may respond to traffic requirements during low speed acceleration without fear of causing a shift to high, which would at that time be undesirable. Actually, at low speeds, the present device is indifferent to slight torque drops, and requires substantially a full "reaction" or release of the accelerator to cause a shift into high gear at such low speeds. When, however, the speed in the lower gear is increased, the extent of the "reaction" necessary to cause a shift into high decreases correspondingly, with the result that the shift-control at such high speeds is highly sensitive or critical, and, in fact, is such that the shift may, at high speeds, take place without "reaction" of the accelerator.

In attaining this discriminatory automatic controlling action of the shift to high, the torque means of the present embodiment is located between the supporting plate 22 and the sleeve 18', as shown in Fig. 1 of the drawings, and it includes the bearing balls 23, thus rendering the torque means substantially friction free. As illustrated in Figs. 1 and 9, the inner rear corner of the supporting plate 22 has an inwardly and rearwardly facing rabbetted grove 43 therein, while the outer face of the sleeve 18', adjacent to the plate 18, has an outwardly and forwardly facing rabbetted groove 44 (Fig. 8a) formed therein in opposed relation to the groove 43, and it is between these two opposed grooves 43 and 44 that the ball bearings 23 are confined. As indicated in Fig. 8a, the inwardly facing surface of the groove 43 and the opposed outwardly facing surface of the groove 44 are in the form of true annular surfaces so that the engagement of the balls 23 therewith serves to support and center the assembly 17"—18.

The other or longitudinally opposed faces of the grooves 43 and 44 are, in the present case, utilized as parts of the torque responsive control means for the high speed clutch 17, and as shown in Figs. 8, 8a, and 9, are formed with opposed, variably curved or inclined cam faces 45 and 46 respectively, which cooperate with the interposed ball bearings 23 to open the high speed clutch 17 when the assembly 17"—18 is rotated slightly in a reverse direction relatively to the driving element 22, or to maintain the clutch open until the assembly 17"—18 is advanced a corresponding amount. Thus, as will hereinafter be more fully explained, the spring mechanisms 42 accomplish their clutch opening action by applying a resilient force between the plate 22 and the assembly 17"—18 tending to rotate said assembly in a reverse direction relatively to the driving plate 22.

As shown in Fig. 8, the balls 23 are held in uniform annularly spaced relation by a spacer ring 47, and the cam surfaces 45 (and 46) are similarly spaced so that each ball 23 takes its proportionate load, it being noted that the entire driving force between the plate 22 and the clutch driving plate 17" is transmitted through the balls 23 and the cooperating cam faces 45 and 46. Hence it is evident that the drag or torque resistance effective between the sloping cam faces 45 and 46 will develop a component of force tending to urge the clutch driving assembly 17"—18 rearwardly or in a clutch opening direction (to the right in Figs. 8, 8a, 9 and 9a) in opposition to the resilient clutch-closing force of the springs 31 which is exerted forwardly as indicated by the arrow 31' in Figs. 8 and 9. This clutch opening component of force, will, of course, tend to maintain the clutch 17 in its open position, or after closing movement has started, to resist or retard such closing movement, and in the form herein shown, the cam faces 45 and 46 are so formed as to vary the relative value or proportion of this clutch opening component as the clutch parts progress through their clutch closing cycle, or opening cycle.

By thus providing for graduated torque responsiveness, the sensitivity of control of the high speed clutch is increased, and the efficiency of its power transmission is increased, and to attain this result the cam surfaces 45 and 46 are so formed that when the clutch 17 is open, as in Fig. 8, the balls 23 contact portions A of the cam faces which are positioned at a relatively slight angle to the plane of rotation of the members, with the result that the driving force acting between the cams has a relatively large component acting to resist closing movement of the clutch from its fully open position.

From its low angle portion A, each cam face increases gradually in angle or degree of slope to its maximum angle at point B (Fig. 9a). When the clutch 17 is completely closed, the ball 23 contacts the cam surface 45 along its high degree portion as determined by wear conditions in the clutch. If the ball finally comes to rest at point C, it will be evident that the component of force resisting closing of the clutch, or tending to open the clutch, is materially reduced, the reduction being, of course, proportioned with relation to the strength of the clutch closing springs 31 so that the cams at normal loads are ineffective and in fact unable to completely open the clutch 17. Thus substantially the full normally obtainable load capacity in the clutch 17 is preserved.

As hereinbefore pointed out, the spring mechanisms 42 constitute clutch opening means for the high speed clutch 17, and in attaining this action, the mechanisms cooperate with and make use of the torque responsive cam means 45—23—46 (Fig. 8), this cooperative action being attained by so relating the springs to the plates 18 and 22 that the springs normally tend to impart a relative reverse or clutch opening rotation to the parts 17"—18. To this end each spring mechanism 42 comprises a spiral torsion spring 47 (Figs. 1 and 7) secured at its inner end to a mounting pin 48 which is fixed non-rotatably in and projects rearwardly from the plate 22 within one of the openings 29' (Fig. 2) of the clutch housing. On the mounting pin 48, between the spring 47 and the plate 22, a disk 49 is rotatably mounted, and to the end of an integral arm 50 projecting radially from the disk 49, the other or outer end of the spring 47 is connected by means of a pin 51.

Thus the spring 47 tends to rotate the disk 49 in a counter-clockwise direction (Fig. 7) and in such rotation a plurality of teeth 49' formed on the edge of the disk 49 engage teeth 49" on the edge of the plate 18 to cause a relative reverse or clutch releasing movement of the plate 18. Such clutch releasing reverse rotation of the plate 18 is limited by spacer studs 52 which extend through arcuate slots 53 in the mounting plate 22. The studs 52, as herein shown, have reduced ends which extend into opposed sockets in the plates 17" and 18, the engagement of these plates with the shoulders of the spacer studs 52 serving to properly space the two plates and effectually transmit clutch closing forces from the plate 18 to the high speed clutch closing or driving plate 17". In attaining this limiting function in respect to the clutch opening action of the springs 47, the slots 53 are so proportioned and located that the ends of the slots act as abutments against which the spacer studs bear when the high speed clutch is fully open.

It will be evident that in order for the high speed clutch 17 to be fully closed, the plate assembly 17"—18 must advance relative to the plate 22 through an angular distance equal to the angular difference between the relative positions of Figs. 8 and 9, and in this movement the arm 50 of each spring return device 42 is rocked in a clockwise direction to the position shown in dotted outline in Fig. 7, in which position it extends radially outwardly from its pivotal center.

In accordance with the present invention, means is provided which is operable to modify the clutch controlling action of the torque responsive mechanism 45—23—46 in accordance with engine speed. To this end the arm 50 of each spring return device 42 has a weight 54 formed thereon adjacent to its outer end so that the increase in centrifugal force as the engine speed increases tends to shift the weight to its outer radial position shown in dotted outline in Fig. 7. This movement of course, does not start until the centrifugal force is sufficient to overcome the opposing force of the springs 47, after which the weights 54 tend to advance the disk 18 and the associated cam means from the position of Fig. 8 to the position of Fig. 9. In the event that the engine speed is increased to a sufficiently high value, the weights may act to totally disable the torque means and permit closure of the clutch 17 by the springs 31, even though the torque acting on the torque responsive means exceeds a value which at lower speeds would prevent closure of the clutch. Conversely, however, the weights 54 do not become active at low speeds, and hence the springs 47 act to increase the effectiveness of the torque means in preventing engagement of the high speed clutch at low engine speeds.

The present invention also provides new and improved means operable to control the engaging movement of the low speed clutch 16 so as to obtain smooth engagement thereof and avoid jumpy starting of the vehicle. This means is torque responsive in character and, as herein shown, comprises a plurality of pressure bars or links 55 interposed between the backing plate 18 and the pressure plate 16" of the low speed clutch. These pressure links 55 constitute the sole power transmitting or driving connection whereby the pressure plate 16" is driven.

As shown in Fig. 10, each pressure link 55 has its opposite ends rounded and set in opposed sockets 56 in the opposed faces of the plates 18 and 16", and the links being located radially outwardly of the intermediate friction disk 16'. In Fig. 10 the parts are shown in full lines in their open clutch positions while the closed clutch relation of the pressure link 55 is indicated in dotted outline. This change of rotative position takes place as an incident to the closure of the clutch 16, and is permitted by the rotatable mounting of the supporting plate 28 and the associated clutch actuating levers 35, and it should be noted that the fully open position of the clutch 16 is determined and limited by suitable stop means, such as by abutment of the lugs 38 with the sides of the openings 33' in the housing 25 (Fig. 1).

It will be evident that as the closing movement of the pressure plate 16" progresses (under the force applied by the springs 31 as indicated at 57 in Fig. 10) there will, upon first engagement with the friction disk 16', be a drag or torque resistance applied to the pressure plate 16" in the direction indicated by the arrow 58. This drag or torque resistance tends to produce relative reverse rotation of the pressure plate 16", and because of the angular positioning of the links 55, such a reverse tendency acts to retard the rate of engaging movement in direct proportion to the torque resistance applied. Thus a sudden or fast engaging movement tending to produce a similarly sudden or jerky start, produces a counter-acting force by means of the links 55 whereby the jumpy starting is eliminated.

To open or disengage the clutches, rocking movement may be imparted to the shaft 40 selectively by means such as a conventional foot pedal 59 fixed to the shaft 40, or by automatic means such as a vacuum controlled unit 59', the structure and operation of which will hereinafter be described in detail. Such opening of the clutches may be effected at any engine speed, the clutch 16 being positively opened by withdrawal of the pressure plate 16" by means of the clutch levers 35. In the high speed clutch 17, the spring devices 42 cause opening of the clutch when the low speed clutch 16 is opened at low speeds, while at high speeds the inherent drag through the release arms 40', the release bearing 39, the arms 35, the plate 16", the pressure links 55 and to the plate 18, causes a sufficient drag or retarding force to be applied to the plate 18 (Figs. 8 and 9) to effect prompt opening of the high speed clutch when the clutch release levers 40' are actuated.

THE SPEED-CHANGE GEARING

In the form herein illustrated in Figs. 1 to 10, it is by manipulation of the speed change gearing 11 that the operator conditions the mechanism selectively for automatic operation, or for operation in the conventional manner through a series of manual selections of successive gear ratios. Hence the gearing for both automatic and conventional operation is, in this case, embodied in a common or single gear box 61 and wherever possible gears or other elements are arranged to serve as elements of both the automatic and conventional power transmission paths.

The manually selected ratios for conventional operation

Thus, the shaft 20 and the concentric sleeve 21, serving as power transmission members from the high and low speed clutches respectively, extend from the bell housing 41 through the adjacent end wall 60 of the gear box 61 in coaxial relation to the driven shaft 13 which projects through the other end wall 60' of the gear box. Bearings 62 and 63 in the walls 60 and 60' support the sleeve 21 and the shaft 13 respectively, and the inner or left hand end of the shaft 13 is rotatably supported by a sleeve bearing 64 (Fig. 1) within the inner end of the shaft 20.

Within the gear box 61 and immediately adjacent to the bearing 62, the sleeve 21 has an integrally formed gear 65 meshing with a relatively larger gear 66 formed on one end of a cluster-gear shaft or sleeve 67 which serves as a counter-shaft. The cluster-gear sleeve 67 is rotatably supported on a bearing shaft 68 which is supported at its opposite ends in the end walls 60 and 60' of the gear box. In attaining the several manually selected gear ratios (other than the high or direct drive) the drive is taken from the counter-shaft 67, which for this purpose has a series of differently sized gears 69, 70 and 71 formed thereon as shown in Fig. 1.

To provide a manually selected non-over-running low speed forward driving gearing from the counter-shaft 67 to the driven shaft 13, a gear 72 is splined on the shaft 13 for sliding movement from an ineffective or neutral position (shown in Fig. 1) forwardly into engagement with the gear 70 of the counter-shaft.

A manually selected reverse drive is obtained by shifting the gear 72 in the opposite or rearward direction into engagement with a back gear 73 which runs in constant mesh with the smaller gear 71 of the counter-shaft.

A manually selected non-over-running intermediate speed forward drive is established from the gear 69 through a gear 74, constantly meshed with the gear 69, and normally running freely on the shaft 13 in fixed longitudinal relation thereto. To connect the gear 74 to the shaft 13, and thus establish the desired drive a clutch member 75 is slidably splined on the shaft 13 between the gear 74 and the gear 106, and complemental clutch teeth 76 and 76' are provided on the adjacent ends of the clutch member 75 and the gear 74 respectively.

To establish manually a high speed or direct forward drive, the clutch member 75 has similar clutch teeth 77 at its other end, adapted, when the member 75 is shifted forwardly or to the left (Fig. 1) from its neutral position, to engage complemental clutch teeth 77' formed in the end of the shaft 20. Thus the high speed drive is obtained from the high speed clutch, while the manually selected non-over-running reverse, low and intermediate drives are taken from the low speed clutch. When the gearing is manually shifted by the usual shifting routine, terminating in a shift to direct drive, the high speed clutch 17 engages promptly and effectually, without perceptible modification by the torque means, this operation being inherent in the mechanism by reason of the removal of all torque during the normal gear-shifting operations. Hence the vehicle is rolling freely forward, with the engine idling or materially reduced in speed, and the power or torque is not applied through the clutch until it has been engaged. As a result the clutch engagement in high is normal in every respect.

Manual selection of the desired gear ratio is, in the present instance, attained by direct manual actuation of the various elements of the gearing mechanism 11 by shiftable means such as a conventional gear shift lever 80 (Figs. 2, 3 and 4), which also serves to condition the mechanism for automatic operation. The gear shift lever 80 has a universal mounting at 81 in the cover 82 of the gear box 61, and by lateral movement of the lever in opposite directions, the lower end of the lever may be selectively engaged with opposed laterally opening slots 83 and 84 formed in brackets 83' and 84' fixed on two slide rods 85 and 86 which are slidably mounted in the walls 60 and 60' for movement parallel to the shaft 13. Through a fork 87, fixed on the rod 85 and engaging a grooved hub 88 on the gear 72, it will be evident that by appropriate actuation of the slide rod 85, the gearing may be set for either low or reverse drive to the driven shaft 13.

A similar fork 89 on the rod 86 engages a grooved outer sleeve 90 surrounding the clutch member 75, Fig. 1, and, the sleeve 90, being held in fixed axial relation to the member 75 by opposed annular flanges 91 and 91' embracing opposite faces of a central flange 92 (see Fig. 1) on the member 75, imparts shifting movement from the slide rod 86 to the clutch member 75 to obtain selectively an intermediate speed or a high speed forward drive.

The gearing for automatic operation

In accordance with the present invention three different driving ratios are called into play automatically each time the vehicle is started and brought up to normal running speed; and in attaining this result the two lower ratio drives are taken from the low speed clutch while the high speed or direct drive is taken from the high speed clutch. In each instance the drive is preferably transmitted to the driven shaft through the clutch member 75, which, for the automatic operation, is by actuation of the gear shift lever 80 placed in its normal high speed position (of Fig. 2) with the clutch teeth 77 and 77' engaged.

To provide for the automatic low speed drive, complemental clutch teeth 93 and 93' (Fig. 1) are formed respectively on the hub 94 of the gear 74 and on the sleeve 90 in such a relation that they are engaged when the clutch member 75 is in its high speed or left hand position; and the flange 92 is formed to receive a plurality of roller type pawls 95 (Figs. 1 and 4) which act to provide an over-running connection between the sleeve 90 and the member 75.

Thus it will be evident that immediately upon engagement of the low speed clutch 16 the movement of the vehicle will be initiated through the relatively low ratio drive from the gear 69 of the counter-shaft to the gear 74, through the dog clutch 93—93', the sleeve 90, and the roller pawls 95 to the clutch 75 which is splined to the driven shaft 13. This drive path may be termed the automatic low ratio or "auto-low" drive of the mechanism.

After the vehicle has been started, the relatively low ratio drive from the counter-shaft gear 69 is superseded automatically, and without torque drop, by an "accelerating" or slightly higher gear ratio, which may be termed the automatic second gear or "auto-second"; and this change in the gear ratio is preferably effected after a predetermined maximum travel of the vehicle. To obtain such an "auto-second" drive I have herein illustrated two alternative forms of mechanism combined with the mechanism thus far described. One such form, shown in Figs. 1 to 10, has a second counter-shaft, while the other form, shown in Figs. 11 and 11a embodies the auto-second mechanism on the main counter-shaft of the gear box.

In providing the auto-second drive of Figs. 1 to 10, a gear 100 is mounted in the gear box 61 (Figs. 1, 2 and 4) in constant mesh with the gear 65 of the low speed transmission sleeve 21, the gear 100 being fixed on a shaft 101 supported at its opposite ends on bearings 102 and 103 in the end walls of the gear box. Surrounding the shaft 101 throughout a portion of its length is a concentric shaft or sleeve 104 carrying an integral gear 105 which is in constant mesh with the gear 106 formed on the inner end of the shaft 20. Thus, by connecting the shaft 101 to the concentric sleeve 104, the output shaft 13 may be driven from the low speed clutch by an auto-second gear train comprising gears 65, 100, 105 and 106; and this gear train is proportioned to give a higher ratio than the drive from the counter-shaft 69 to gear 74 which comprises the auto-low drive.

Means is provided for connecting the two shafts 101 and 104 automatically to throw the auto-second gear ratio into operation, and this means comprises a clutch means and an automatic operating means therefor, the operating means preferably being in the nature of a screw and nut device operable in timed relation to the vehicle movement by the various elements of the automatic low speed or auto-low drive during the starting of the vehicle thereby. Thus a clutch means 108 is provided between the shafts 101 and 104 adjacent to the end wall 60' of the gear box, and a nut 109, engaging screw threads 110 on the shaft 101, is arranged to engage the sleeve 104 so that by relative rotation of the shafts 101 and 104 the nut 109 may be shifted longitudinally to engage or release the clutch means 108.

In order that the mechanism may be made of sufficient strength or capacity to take the load, while being of a compact construction, the clutch means 108 is preferably in the nature of a synchronizer clutch which in its initial engagement is strictly frictional in action, while acting at the end of its engagement as a positive clutch. For the sake of clarity and in order to avoid confusion with the clutches 16 and 17, the clutch means 108 will in many instances herein be termed the synchronizer. Thus, in the preferred form shown in Figs. 1 to 6, the clutch means 108 comprises a clutch housing formed by an end wall 113 which is formed by an integral flange on the shaft 101 adjacent the wall 60' and a concentric cylindrical side wall 114 centered and rotatably supported at one end by said end wall 113 and projecting beyond the adjacent end of the sleeve 104. Between the cylindrical wall 114 and the sleeve 104, a roller bearing 115 is preferably provided, while an integral flange 116 on the sleeve 104 serves to close the end of the clutch housing adjacent to but outside of said bearing 115. At its other end the sleeve 104 is supported by a bearing 117 running within the gear 100.

Within the housing 114 a plurality of friction disks 118 are positioned adjacent to the end wall 113, the disks being splined alternately to the external splines 118' on the shaft 101 (Figs. 2, 4 and 6) and to internal splines 118" on the cylindrical side wall 114 (Figs. 2 and 5), a pressure plate 119 for engaging or closing the clutch being positioned at the other or left end of the disks 118 in splined relation to the wall 114. Between the plate 119 and the end of the sleeve shaft 104, there is preferably provided a pressure assembly comprising a pressure block 120 having a series of expansive coil springs 121 mounted in bores 122 therein and acting between the block 120 and the pressure plate 119.

As shown in Figs. 1, 2 and 5, the pressure plate 119 and the pressure block 120 are splined to the splines 118" of the housing, and the pressure block rides on an annular bearing surface 120' on the shaft 101 so as to center and support the central portion of the housing assembly 114 and thereby render the bearing 115 effective to support the rear or adjacent end of the sleeve 104.

When the clutch disks 118 are fully engaged, the side wall or clutch housing 114 is driven with the shaft 101, and this rotation is transmitted to the sleeve 104 through inter-engaging lugs 125 and 126 (Figs. 1 and 6) on the wall 114 and the flange 116 respectively.

The nut 109, as shown in Figs. 1 and 2, is positioned in the radial space between the shaft 101 and the sleeve 104, with its inner face threaded to fit the screw threads 110. The outer face of the nut 109 is arranged to contact the inner face of the sleeve 104 so that the relative rotational displacement or rotation of the sleeve 104 with respect to the screw 110 will effect turning of the nut 109 on the screw 110 and thereby cause the desired endwise shifting of the nut 109. The threads used in the embodiment of Fig. 1 are right hand threads, and it will be evident that during most of the driving time, that is, when driving in high, the gear 104 will rotate faster (in the direction indicated in Fig. 2) than the gear 100, so that the nut 109 will be screwed toward its inactive or left hand position of Fig. 1, and that after reaching this position, the relative rotation of the parts 101 and 104 will tend to cause a further left hand movement. Such further movement of the nut is blocked by the adjacent end face of gear 100, and the inner face of the sleeve 104 in the left hand end zone then occupied by the nut is, therefore, formed as an annular bearing surface 127 (Fig. 2) which has merely a frictional engagement with the outer face of the nut 109. Preferably the nut 109 is provided with an expansive split ring 109' mounted in the grooved outer forward corner of the nut and pinned to the nut to prevent relative rotation as indicated in Figs. 2 and 6. To the right of the surface 127 the inner face of the sleeve 104 has longitudinal splines 128 which are engageable by complemental external splines on the nut 109 and the friction ring 109'; the initial engagement of these splines, in a right hand or rearward movement of the nut, being facilitated by pointing the adjacent ends thereof as shown in Fig. 2.

When the automatic drive mechanism is to be used, the clutch 90 is shifted forwardly, or to the left in Fig. 1, so as to engage the clutches 77—77' and 93—93'. Thus when the vehicle is started, the auto-low drive through the gears 65, 66, 69—74, rotates the gears 106, 105, Fig. 2, (the high speed clutch being held open at this time by its torque responsive or other control means); gear 65 also rotates gear 100, and while gears 100 and 105 are being thus rotated in the same direction, the rotation of the two is, however, at different speeds, due to the proportional relation of the gear trains 65—100 and 65—66—69—74—106—105. This ratio of the two gear trains is such that during auto-low drive the gear 105 rotates slower than the gear 100, and hence the right hand threaded screw shaft 101 shifts the nut 109 rearwardly, or in its clutch closing direction. Preferably the lead of the screw is such that, with a conventional rear axle gearing, the nut 109 is moved the length of the sleeve 104 in about 25 feet of forward travel of the vehicle. Thus the synchronizer 108 is gradually engaged to approach the relationship shown in Fig. 2 so that the auto-second gearing 65—100—105—106 invariably becomes effective to drive the shaft 13 after the vehicle has been brought up to an appropriate speed by the auto-low drive. The auto-low drive is then ineffective by reason of the overrunning connection 95. It will be evident that this change in the drive takes place without a sharp drop in engine torque so that the low speed clutch retains its effective torque control of the high speed clutch.

As above noted, the synchronizer nut 127, in its rearward or engaging movement, merely approaches the relation of Fig. 2, but does not necessarily reach this rear position, for the reason that by partially compressing the springs 121, the disks 118 will in many instances be engaged with sufficient force to pick up and carry the load in "auto-second" drive. The extent of engaging movement of the nut 109 is, therefore, determined by the load to be taken, and in many instances the "auto-second" drive will become effective at less than the predetermined maximum travel in "auto-low."

As soon as the high speed clutch 17 engages so as to supersede the "auto-second" drive, the two gears 65 and 106 are driven at the same speed, and due to the ratio between these two gears, the direction of relative rotation of the shafts 101 and 104 is reversed, and by such reversed relative rotation the nut 109 is returned to its released or left hand position (Fig. 1), thereby opening or releasing the synchronizer 108 and conditioning the apparatus for another vehicle-starting operation. The relative reverse or reconditioning rotation of the shafts 101 and 104 is preferably more rapid than the clutch-closing rotation thereof, the present embodiment having a proportioning of the various gears such that the nut is fully returned in substantially one-half the vehicle travel required to engage the synchronizer.

To insure release of the synchronizer without undue wear or stress I have herein provided a lost motion of about 170 degrees between the lugs 125 of the sleeve 104 and the lugs 126 of the housing 114, as shown in Fig. 6, so that the sleeve 104 may freely rotate the nut 109 through this angle about the screw shaft 101. During this free rotation, the nut is freed from the pressure block 120 so as to release the synchronizer, and hence the housing 114 may thereafter rotate with the sleeve 104 independently of the shaft 101.

Automatic control

In accordance with the present invention the clutch actuation is automatically governed by an interrelated system of control in which the clutches 16 and 17 are closed when the engine is stopped, released or opened automatically when the engine idles, and have a controlled engagement above idling speeds under a governing action depending in part upon the load interposed in the transmission path, and also depending in part upon the engine speed. To this end the vacuum actuator 59' (Fig. 3) has a cylinder 130 pivoted at one end 130' on a supporting bar 131 projecting from the gear box 61, and from a piston 132 within the cylinder 130, a piston rod 133 extends through a suitable opening in the other end 130" of the cylinder to a connection with the end of a lever 134 fixed on the clutch release shaft 40. From the end 130' of the cylinder a vacuum line 135 extends to the manifold 136 beyond or inwardly of the throttle valve 137, the throttle valve 137 in the present instance being shown, for convenience, as being mounted in the manifold rather than in the carburetor. Thus, during low speed or idling operation of the engine, the high vacuum or suction in the manifold 136 acts through the line 135 to exhaust the end 130' of the cylinder 130 so as to release or open the clutches 16 and 17.

High vacuum conditions may also exist during high speed operation of the engine under light load, and hence means is provided to prevent actuation of the vacuum unit and the consequent undesired opening of the clutch at high speeds. This means preferably comprises a valve 140 interposed in the vacuum line 135 and operated in response to a function of the engine speed, as well as in response to accelerator position. In the present instance the valve 140 is normally urged to its closed position of Fig. 3 by gravity, or by a spring 141, and is opened by a solenoid 142 so that its valve member 140 opens the line 135 when the solenoid is energized. In the open or right hand position of the valve member, the chamber end 130' is connected to the manifold and under high vacuum conditions the vacuum unit is actuated to open the clutch. If, however, the solenoid is deenergized, the valve member 140 shifts its position to that of Fig. 3 to close the passage to the manifold, and through the passage 143 in the valve member, to open the end 130' of the cylinder to atmosphere.

To provide a control circuit for the solenoid coil 142 one terminal of the battery 144 is grounded at 144', and a wire 144" extends to one contact of the ignition switch 145. From the other terminal of the ignition switch 145 a wire 145' extends to one terminal of a normally open spring type switch 146, the function and mounting of which will be hereinafter described. From the other contact of the switch 146 a wire 147 extends to one end of the solenoid coil. The other end of the coil is connected by a wire 149 to the stationary contact of a switch 150, which has its movable contact mounted on the shiftable armature 151 of the conventional generator cut-out unit 152 so that the switch 150 is opened when the armature is actuated due to high speed operation of the generator. The cut-out unit is in other respects conventional in construction and operation. A wire 153 connects the movable contact of the switch 150 to ground so as to complete the solenoid control circuit. Preferably the cut-out mechanism is arranged to open the switch 150 and thereby disable the clutch release cylinder at an engine speed corresponding to a vehicle speed of 18 miles per hour in high gear, it being found that above this speed there should exist, under normal conditions, no reason for desiring automatic clutch release.

Preferably, the closed chamber 155 at the opposite end of the vacuum cylinder 130 is utilized to provide an air bank to cushion and control the return movement of the piston and prevent rapid clutch engagement during relatively low speed operation of the engine. For this purpose, a one-way check valve 156 is provided to govern the passage of air through the wall 130" and permit rapid entry of air when the unit is actuated, while an air bleed valve 157 is provided to govern the escape of air from the chamber 155. The valve 157 provides an outlet which may be varied by movement of the tapered valve member 158 in accordance with the positioning of the throttle 137. To this end a positioning link 159 connects an arm 160 on the throttle valve shaft with the outer end of the valve 156, so that the valve 158 is opened generally in proportion to the throttle opening. Thus fast clutch closure is permitted at high engine speeds, while a controlled or air-banked closure is provided at slow engine speeds.

The switch 146, above described as being normally open, is mounted on the link 159 so as to be located in the path of an accelerator-actuated pull rod 159' which is connected with a lost motion connection 159" to the pivot pin which connects the link 159 and the arm 160. When the accelerator pull rod 159' is in the idling position shown in Fig. 3, its end abuts and closes the switch 146.

The switch 150 of the generator cut-out is, of course, closed when the engine is at rest, and hence the closure of the ignition switch 145 in starting the engine causes instantaneous opening of the vacuum cut-out valve 140. The vacuum unit 130 is, therefore, actuated in the starting of the engine to open the clutch 10, and the open position is maintained so long as the engine operates at idling speed. When the engine speed is increased by actuation of the accelerator and its pull rod 159', the switch 146 is immediately released and allowed to open, thereby causing immediate release of the vacuum unit, which, of course, releases the clutch for engagement by the clutch springs 31, the releasing movement of the vacuum unit being to some extent governed by the engine speed and power due to the banking action resulting from the position of the variable bleed valve 158.

To secure a supplemental manual control of the vacuum actuator, a shunt for the switch 150 may be provided as indicated by the dotted lines in Fig. 3. This circuit comprises a normally open push button switch 161 located in any preferred position, such as at the top of the gear shift lever 80, and connected by wires 162 and 163 to the wires 145' and 153. Thus, by depressing the switch 161 during high speed operation of the vehicle, the solenoid coil 142 may be energized and the vacuum line 135 connected to the manifold. This causes the clutch 10 to be opened, due to the actuation of the vacuum unit 130, and hence shifting of the gears may be easily performed. Also, the switch 161 may be employed to obtain a free wheeling action.

*Alternative "auto-second" construction*

In Figs. 11 and 11a of the drawings I have illustrated an alternative embodiment of the gearing 11 which cooperates with the clutch mechanism and control mechanism of the other embodiment to attain a corresponding functioning, while being constructed with but a single counter-shaft assembly. Thus a gear box 61a is provided, generally similar to the gear box 61 of Fig. 1, with the concentric transmission shafts 20 and 21 projecting through the forward wall 60a thereof in a similar manner, and the driven shaft 13 similarly extending through the rear wall 60b. The shafts 20 and 21 carry similar gears 65 and 106, and the gears along the shaft 13 are the same as in the embodiment of Fig. 1.

Directly below and parallel to the shaft 13, is a counter shaft 170 supported on bearings 171 and 172 in the front and rear walls 60a and 60b of the gear box, and the counter shaft is driven from the gear 65 of the low speed clutch by a gear 100' fixed to the shaft 170 and in constant mesh with the gear 65. Adjacent to the rear wall 60b, a cluster gear 67' is fixed to the shaft 170, providing gears 69', 70' and 71' serving the functions of the correspondingly designated gears of the embodiment of Fig. 1.

When the gearing is conditioned for automatic shifting as explained in connection with the other embodiment, engagement of the low speed clutch 16 causes drive to be transmitted to the shaft 13 through the "auto-low" path which comprises gears 65, 100', shaft 170, gears 69', 74, and clutch 90—95—75 to the shaft 13. During such "auto-low" drive, an alternative form of "auto-second" drive is gradually brought into play in a manner similar to that described in connection with the embodiment of Fig. 1.

To this end, a synchronizer clutch 175 is provided, surrounding the shaft 170, and through which drive from the shaft 170 may be transmitted to a gear 105' which surrounds the shaft 170 and is in constant mesh with the gear 106, thereby to provide the auto-second drive path. As shown in Figs. 11 and 11a, the gear 105' is formed intermediate the ends of a relatively large sleeve 176, and the forward end of the sleeve 176 is supported by a bearing 177 mounted within the gear 100'. The other end of the sleeve 176 is externally splined at 178 (Fig. 11a) and projects slidably into the forward end of a sleeve 179 which forms a portion of a housing for the synchronizer clutch 175. At its rear end the housing sleeve 179 has an inturned end flange or backing wall 180 which at its inner periphery surrounds and rides rotatably on a sleeve 181 which is slidable, and in a limited degree freely rotatable on the shaft 170.

Within the housing sleeve 179 a plurality of friction disks 185 are provided, splined alternately to the housing sleeve 179 and the sleeve 181, the disks 185 being adapted to be operatively engaged by endwise compression between the end wall 180 and a pressure plate 186 which surrounds and is splined to the sleeve 181 forwardly of the disks 185.

To produce the relative endwise approaching movement of the pressure plate 186 and the end wall 180 in the desired timed relation to the vehicle travel in "auto-low," the relative rotational movement of the gear 100' and the gear 105' is utilized in the general manner employed in the embodiment of Fig. 1, but with this difference, however, that the embodiment of Figs. 11 and 11a is constructed to effect an inherent economy of space which is not attained by said embodiment of Fig. 1. Thus the present embodiment preferably employs two screw and nut devices operable in sequence, the first to condition the mechanism for engagement of the synchronizer, and the second to effect the actual engagement of the clutch disks thereof.

These two screw and nut devices are preferably disposed at opposite ends of the synchronizer 175, and while actuated by the same relative rotation of the gears 100' and 105', they must move in opposite directions toward each other to engage the synchronizer, and in opposite directions away from each other to release the synchronizer.

Since the present invention contemplates and provides for rapid conditioning of the synchronizer, followed by relatively slow or gradual actuation during actual engagement, one of the screw and nut devices is constructed with a relatively great lead for conditioning the device, while the other screw and nut device has a gradual or smaller lead so as to act subsequently to effect slow engagement of the synchronizer. Thus the conditioning screw and nut device is herein shown as comprising a nut 190 surrounding and splined to the rear end of the sleeve 181 and having relatively high pitch left hand threads 191 on its outer surface engaging corresponding threads formed in a recess 192 in the gear 69'. At its inner forward corner the nut 190 has a rabbetted groove 190' to provide clearance for an annular abutment flange 193 formed on the sleeve 181, so that the forward face of the nut may abut and frictionally engage the rear face of the wall 180 as shown in Fig. 11a.

During the transmission of drive through the auto-low gearing, the gear 105' rotates slower than the shaft 170, and hence through the splines 178, the housing 179, end wall 180, and the frictional contact of wall 180 with the nut 190, this nut 190 is in effect retarded with relation to the gear 69'. In effecting such retardation of the nut 190, the inherent drag between the friction disks 185 is also a factor. The threads 191, therefore, force the nut 190 forwardly at a rapid rate from the position of Fig. 11a to the position of Fig. 11. In this movement the nut 190 shifts the entire synchronizer housing until the forward end of the housing sleeve 179 abuts the gear 105' and the pressure plate 186 engages the adjacent end of the sleeve 176. In such engagement the plate 186 produces a slight engagement of the friction disks 185, which, however, is preferably insufficient to cause transmission of rotative movement by the disks.

After the conditioning of the synchronizer 175 by the forward shifting of the nut 190, the operative engagement of the friction disks 181 is effected gradually by the other screw and nut device which, as herein shown, is located forwardly of the synchronizer and comprises a synchronizer nut 195 having relatively small lead left hand threads 196 formed externally thereon and engaging corresponding threads 196' formed on the interior of the sleeve 176. In order that gradually increasing pressure may be applied to the pressure plate 186 as the nut 195 moves rearwardly, a spring assembly is provided between the nut 195 and the plate 186. To this end a spring retainer plate 197 is interposed between the plate 186 and the nut 195, and a plurality of expansive coil springs 198 are housed and held in place in opposed bores 199 formed in the nut 195 and the retainer plate 197.

During the forward conditioning movement of the conditioning nut 190 and the synchronizer unit, the external splines of the forward end of the sleeve 181 are engaged with internal splines 200 of the synchronizer nut 195, with the result that there is then a positive rotation transmitting connection from the gear 69' through the threads 191, the nut 190 which is splined to the sleeve 181, and through the sleeve 181 and splines 200 to the synchronizer nut 195. Since the gear 105' is at this time rotating slower than gear 69' (both in the direction indicated) the pressure nut 195 is forced rearwardly to gradually apply more and more pressure to the friction disks 185, and thereby cause the synchronizer to become effective as a drive transmitter. Hence the auto second drive supersedes the auto low drive as described in connection with the embodiment of Fig. 1. There is, however, a distinction in the operation of the two embodiments, since in the form of Figs. 11 and 11a, there is, after the conditioning of the synchronizer, but little idle or ineffective movement of the synchronizing nut 195. Thus the compression of the springs 198 starts almost immediately after the relative rotation of the advancing nut 195 is initiated, and hence, the functioning of the auto-second drive may start at any time thereafter, depending upon the spring loading required to pick up the load in auto-second.

Relative to the transmission of drive between the gear 69' and the threads 191, it is noted that the nut 190 is, during such transmission, held against further forward movement by abutment of the sleeve 179 with the gear 105', and the threads 191 are of sufficient strength and of such a relatively great pitch as to take the driving force without excessive unit stress and without locking. The end thrust involved in this action is taken by the bearing 177.

Release of the synchronizer 175 takes place immediately upon engagement of the high speed clutch 17 since the gear 105' is then driven faster than the gear 69', as explained in connection with the embodiment of Fig. 1. Hence the conditioning nut 190 is screwed rapidly rearwardly from the position of Fig. 11 to the position of Fig. 11a, thereby quickly releasing the synchronizer 175. This rapid releasing movement is cushioned by the dash pot effect of the oil trapped in the recess 192 and which must be discharged through a control port 192' formed in the gear 69'. In such releasing movement, the springs 198 expand and shift the spring retainer plate 197, the pressure plate 186, the friction disks 185, the housing 179 and the sleeve 181 to the rearward positions of Fig. 11a. The splines 200 are, however, still engaged with the nut 195, so that after the nut 190 has reached its limit of rearward travel and rotation, the nut 195 is held or retarded to the slower speed of the gear 69', with the result that the faster moving internal threads 196' of the sleeve 176 withdraw the synchronizer nut 195 forwardly to its position of Fig. 11a. This forward movement releases the nut 195 from the splines 200 so that the nut 195 rotates with the sleeve 176 until the succeeding conditioning of the synchronizer by nut 190.

Operation

When the engine is stopped and the vehicle is at rest, the clutches 16 and 17 are normally closed as illustrated in Fig. 1, and hence the driver may, by engaging any of the shiftable gears of the transmission, use the engine as a brake to prevent undesired movement of the vehicle. To start the engine, the ignition switch 145 is closed so as to open the cut-out valve 140, and hence the manifold vacuum, in the first rotation of the crank shaft by the starter, causes the vacuum unit 59' to open the clutches 16 and 17. With the engine running at idling speed, the actuator 59' maintains this open clutch relationship, but immediately upon actuation of the accelerator to cause an increase of engine speed above idling, the opening of the switch 146 causes the valve 140 to close, so that the actuator 59' releases its piston 132 for forward movement. This release of the clutch opening piston 132, of course, has no effect so long as the gearing mechanism is in the neutral relation of Fig. 1, so that the engine may be warmed up in the same manner as with conventionally constructed cars. In the event that the driver prefers to leave the gearing conditioned for automatic or other operation during such warming of the engine, he may follow conventional practice and depress the clutch pedal during the warming period.

The driver, with the present mechanism, may utilize either the automatic ratio-changing functioning or the conventional manual gear-shifting sequence, and such conventional shifting operations may be performed without training or instruction by any driver who is competent to drive conventional automobiles of today. Thus, the shifting of the gearing to automatic positioning, to reverse, to manual low or manual second, may be accomplished in the conventional manner while the engine idles without depression of the clutch pedal, and to a driver familiar with conventional vacuum clutch devices, this is in accordance with his previous experience. Drivers who are unfamiliar with such automatic clutch release devices would, of course, depress the clutch pedal, and this normal action of such drivers may take place without producing unexpected results which might lead the driver to question his ability to properly operate the vehicle.

If the driver desires to proceed in the automatic gear relationship, the gearing is shifted by the usual shift lever 80 to the "conventional high" or automatic position of Fig. 2. The engine speed is then increased substantially above idling so as to cause release of the piston 132, thereby permitting engaging movement of the low speed clutch 16 by the clutch springs 31. The speed of such movement is controlled by the position of the banking valve 158 which permits increased engaging speed as the degree of throttle opening is increased. Hence a primary control of the rate of clutch engagement is obtained, and in addition, the torque responsive action of the pressure links 55 retards the closing movement of the low speed clutch in a manner which prevents jumpy starting of the vehicle.

Drive is then transmitted through the "auto-low" drive path, and during such auto-low drive, the engaging means of the "auto-second" drive is operated in timed relation to the vehicle travel so as to render the auto-second drive operable during or at the end of a predetermined travel of the vehicle.

Thus the synchronizer 108 (or 175 of Fig. 11) is engaged and takes up the drive of the vehicle without noticeable torque drop, so that the torque control or "hold-out" means of the high speed clutch 17 retains its effective control of the high speed clutch. Acceleration of the vehicle is, therefore, continued in auto-second drive until the torque acting through the torque control of the high speed clutch is reduced to a level appropriate to the assumption of the drive in high. At low engine speeds such transfer of the drive is attainable only by substantially a full reaction or release of the accelerator, while at increased engine speeds the torque may reduce sufficiently to cause a shift without reaction. Such enforced shifting takes place in any event when excessive speeds are attained in auto-second, such shifting being caused by the action of the weights 54 in disabling the torque responsive hold-out means of the high speed clutch.

Immediately upon assumption of the drive in high, the actuating nut of the synchronizer is withdrawn rapidly to its inactive position of Fig. 2 so as to condition the auto-second drive for another vehicle starting operation.

When the vehicle is to be stopped, the accelerator is released, and the resulting increase in vacuum releases the clutches 16 and 17 if, or as soon as, the vehicle speed is less than 18 miles per hour, the brake being applied in the usual manner to complete the stop. The automatic starting operation may then be repeated as above described.

In its automatic operation the present device is more or less keyed to the normal driving reactions of present day drivers whose desire for maintenance, reduction or increase of speed or power is normally expressed and measured by the amount or rate of accelerator depression or release. Thus the mechanism possesses an inherent automatic responsiveness to the desires of the driver as expressed by the position, or speed or direction of movement of the accelerator, but such responsiveness is, however, automatically modified to control such responsiveness in a degree which prevents abuse of the mechanism and insures smooth acceleration under all conditions. The present apparatus is of such a character that the three graduated drive ratios are invariably applied in succession in starting the vehicle from rest, although load conditions may act to vary the periods of functioning of the auto-low and auto-second drives in a manner which is consistent with the ratio between the effective load and the torque capacity of the engine.

I claim as my invention:

1. An automatic transmission comprising, in combination, driving and driven shafts, low and high speed clutches driven from said drive shaft and adapted to be closed in succession, said clutches having low speed and high speed transmission elements respectively constituting the power output elements of said clutches, a counter-shaft geared to the output element of said low speed clutch for rotation thereby at a reduced speed, a manually operable gear-shift member, selective gearing means operatively connected to said counter-shaft and said driven shaft and including shiftable selecting means operable by said gear-shift member to establish selectively between said counter-shaft and said driven shaft a reverse driving connection, a non-over-running low speed forward driving connection, a non-over-running intermediate speed forward driving connection, or to establish simultaneously a non-over-running high speed forward driving connection between said high speed transmission member and said driven shaft and an over-running low speed forward driving connection between said counter-shaft and said driven shaft, a second counter-shaft, reduction gearing driving said second counter-shaft from said low speed transmission member, a second shaft having a geared connection with said high speed transmission member, a synchronizer clutch for connecting said second counter-shaft with said second shaft in driving relation, and a screw and nut device operatively associated with said synchronizer clutch and operable by relative rotation of said second shaft and said second counter-shaft during operation of said driven shaft through said low speed over-running drive to engage said synchronizer clutch to drive said driven shaft from said second counter-shaft.

2. A transmission of the character described comprising, in combination, driving and driven members, low and high speed clutches driven by said drive shaft and adapted for successive connection with the driving member, means for opening and closing said clutches, torque responsive control means operatively connected between said driving member and said clutches and operable automatically during high torque conditions to oppose the action of such clutch closing means to prevent closure of said high speed clutch during such high torque conditions, a gear shift lever movable between neutral, a reverse position, and low, intermediate and high positions, gearing mechanism including a low ratio gear connection between said driven shaft and said low speed clutch whereby said driven shaft may be driven at a reduced speed by said low speed clutch, said connection including an over-running clutch, and a dis-engageable dog clutch, said dog clutch having shifting means operable by said shift lever when moved to its high position to engage said dog clutch, said gearing mechanism also including means operable by said shift lever to establish, selectively, in the different positions of said lever, a reverse driving connection between said low speed clutch and said driven shaft, a low speed forward driving connection between said low speed clutch and said driven shaft independently of said over-running clutch, a non-over-running intermediate ratio forward driving connection between said low speed clutch and said driven shaft, or when said shift lever is in its high position, a high ratio driving connection between said high speed clutch and said driven shaft, said dog clutch being engaged while said last mentioned high speed ratio connection is established, whereby to provide a low speed over-running low ratio forward drive to said driven shaft from said low speed clutch and a high speed drive to said driven shaft from said high speed clutch, and gearing means providing a "second" speed automatic drive from said low speed clutch to said driven shaft comprising a reduction gear connection including a synchronizer clutch between said low speed clutch and said driven shaft, and means invariably operable by the gearing means during a predetermined number of rotations of said driven shaft through said over-running low speed drive to engage said synchronizer clutch and render said "second" speed automatic gear connection effective to operate said driven shaft from said low speed clutch.

3. An automatic transmission of the character described comprising, in combination, driving and driven members, low and high speed clutches driven from said driving member adapted for successive connection with the driving member, means for opening and closing said clutches, torque responsive control means operatively connected between said driving member and said clutches and operable automatically during high torque conditions to oppose the action of such clutch closing means to prevent closure of said high speed clutch during such high torque conditions, gearing mechanism including a low ratio gear connection between said driven shaft and said low speed clutch whereby said driven shaft may be driven at a reduced speed by said low speed clutch, said connection including an over-running clutch and a first dis-engageable dog clutch, dog clutch means operable when said first dog clutch is engaged, a high speed drive from said high speed clutch, and means providing a "second" speed automatic drive comprising a reduction gear connection between said low speed clutch and said driven shaft and including a friction clutch, and means operatively connected to said over-running low speed drive connection and operable as an incident to the transmission of drive through said over-running low speed drive connection to engage said friction clutch and render said "second" speed automatic gear connection effective to operate said driven shaft from said low speed clutch.

4. An automatic transmission comprising, in combination, a driving shaft, a driven shaft, transmission means providing alternatively operable low speed, intermediate speed and high speed power transmission paths between said shafts, a low speed clutch forming part of said low speed and intermediate speed transmission paths, and a high speed clutch forming part of said high speed transmission path, means operable automatically in response to a running function of an engine to close the low speed clutch to render said transmission means effective through said low speed transmission path, means connected to and operable by the means forming said low speed clutch to render said transmission means effective through said intermediate ratio transmission path after a predetermined number of revolutions of said driven shaft through said low speed transmission path, and means operable automatically in response to a running function of the engine to close said high speed clutch to render said transmission means effective through its high speed transmission path.

5. In an automatic transmission, the combination of driving and driven shafts, low and high speed clutches adapted when engaged to be driven from said driving shaft, means operable automatically in response to a running function of an engine to engage said low and high speed clutches in succession, means operable to connect said high speed clutch in driving relation to said driven shaft, and means for connecting said low speed clutch to said driven shaft including a low ratio gearing connected to transmit drive to said driven shaft immediately upon engagement of said low speed clutch, and a normally ineffective intermediate ratio gearing between said low speed clutch and said driven shaft, and means operable after a predetermined maximum number of revolutions of said driven shaft by said low ratio gearing to render said intermediate ratio gearing effective to drive said driven shaft.

6. An automatic transmission comprising, in combination, a driving shaft, a driven shaft, transmission means providing alternatively operable low speed, intermediate speed and high speed power transmission paths between said shafts, means operable automatically in response to a running function of an engine to render said transmission means effective through said low speed transmission path, means operable automatically after a predetermined number of revolutions of said driven shaft through said low speed transmission path to render said transmission means effective through said intermediate ratio transmission path, and means operable automatically in response to a running function of the engine to render said transmission means effective through its high speed transmission path.

7. In an automatic transmission, the combination of driving and driven shafts, a low speed clutch and a high speed clutch both adapted to be driven from said driving shaft and arranged for closure in succession, a low ratio reduction connection between said low speed clutch and said driven shaft including an overrunning device, an intermediate ratio reduction connection between said low speed clutch and said driven shaft including a synchronizer clutch, means providing a high speed drive connection between said high speed clutch and said driven shaft, and means actuated in timed relation to the rotation of said driven shaft operable to close said synchronizer clutch when said driven shaft is actuated by said low speed connection, to maintain said synchronizer clutch closed while said driven shaft is actuated by said intermediate connection and to open said synchronizer clutch when said driven shaft is actuated by said high speed connection.

8. In a transmission, the combination of driving and driven shafts, a first low ratio geared connection between said shafts, including an overrunning device, a second higher ratio geared connection between said shafts including a synchronizer clutch, and a control device for governing the engagement of said synchronizer clutch operable in timed relation to the rotation of said driven shaft to close said clutch after a predetermined number of revolutions of said driven shaft by said first connection, said control device including torque responsive means subjected to the torque in said second connection when said synchronizer clutch is closed and operable while said torque persists to maintain said clutch closed.

9. A transmission as defined in claim 8, having means providing a third driving connection between said shafts of a higher ratio than said second connection and including a high speed clutch driven from said driving shaft, and wherein said torque responsive means is associated with said high speed clutch to prevent closure thereof during high torque conditions in said second connection.

10. In an automotive vehicle, the combination of an automatic transmission having driving and driven shafts, a low speed clutch and a high speed clutch adapted to be driven from said driving shaft and arranged for closure in succession, a low ratio reduction connection between said low speed clutch and said driven shaft including an overrunning device, an intermediate ratio reduction connection between said low speed clutch and said driven shaft including a friction clutch, means providing a high speed drive connection between said high speed clutch and said driven shaft, and control means operable after a predetermined travel of said vehicle while driven by said low ratio overrunning connection to close said friction clutch and render said intermediate ratio connection effective to drive the vehicle, said control means being operable to maintain said friction clutch closed while said driven shaft is actuated by said intermediate connection and to open said friction clutch when said driven shaft is actuated by said high speed connection, and torque responsive means operable to resist and control closure of said high speed clutch.

11. An automatic transmission comprising, in combination, driven and driving shafts, low and high speed clutches driven from said driving shaft and adapted to be closed in succession, said clutches having low speed and high speed transmission elements respectively constituting the power output elements of said clutches, a counter-shaft geared to the output element of said low speed clutch for rotation thereby at a reduced speed, a manually governable gear shift member, selective gearing means connectible between said counter-shaft and said driven shaft and including shiftable selecting means operable by said shift member to establish selectively between said counter-shaft and said driven shaft a reverse driving connection, a non-over-running low speed forward driving connection, a non-over-running intermediate speed forward driving connection, or to establish simultaneously a non-over-running high speed forward driving connection between said high speed transmission member and said driven shaft and an over-running low speed forward driving connection between said counter-shaft and said driven shaft, a second shaft and a third shaft concentrically related, one of which is tubular and has the other extending therethrough, reduction gearing driving said second shaft from said low speed transmission member, a geared connection between said third shaft and said high speed transmission member proportioned relative to the reduction gearing to said second shaft to cause relative rotation of said second and third shafts in one direction when said driven shaft is actuated by said over-running low speed forward driving connection, a synchronizer clutch for connecting said second and third shafts in driving relation, a screw on one of said concentric shafts, a nut engaging said screw and frictionally engaging the other of said concentric shafts, said nut being operable by said relative rotation of said second and third shafts in said one direction during operation of said driven shaft through said low speed over-running drive to move said nut longitudinally of said concentric shafts to engage said friction clutch so as to drive said driven shaft from said third shaft.

12. An automatic transmission as defined in claim 11 wherein the gearing connection to said second and third shafts are proportioned to reverse said relative rotation of said second and third shafts when said high speed clutch is engaged.

13. An automatic transmission as defined in claim 11 wherein said gearing connections are so proportioned that when said high speed clutch is closed said second and third shafts are rotated in the opposite relative direction at a substantially higher rate than the rate of relative rotation in said one direction.

14. An automatic transmission, the combination of driving and driven shafts, an over-running low speed drive connection between said shafts, a non-over-running high speed drive connection between said shafts including a clutch, a normally ineffective intermediate speed drive connection between said shafts including a synchronizer operable when closed to render said intermediate speed drive effective, and a screw and nut device operatively connected to said low speed drive connection and to said synchronizer and operable by said low speed drive connection to engage said synchronizer and by said high speed drive connection to release said synchronizer, one of the elements of said screw and nut device constituting the power output member in said intermediate drive connection from said synchronizer, and a rotative lost-motion connection between said element and said synchronizer.

15. An automatic transmission of the character described comprising, in combination, driving and driven shafts, transmission means providing alternatively operable low speed, intermediate speed and high speed power transmission paths between said shafts, a low speed clutch forming part of said low speed and intermediate speed transmission paths, and a high speed clutch forming part of said high speed transmission path, means operable automatically in response to a running function of an engine to close said low speed clutch to render said transmission means effective through said low speed transmission path, means operable by the transmission means of said low speed path to render said transmission means effective through said intermediate ratio transmission path, and torque responsive means connected to receive torque from said low speed and intermediate speed drive path and operable by said torque to control the closure of said high speed clutch.

16. In a transmission for automotive vehicles, the combination of driving and driven shafts, low and high speed clutches driven from said driving shaft and adapted for closure in succession, transmission means forming a low ratio driven from said low speed clutch to said driven shaft, transmission means forming a normally ineffective intermediate ratio drive from said low speed clutch to said driven shaft and including a friction clutch, means forming a higher ratio drive from said high speed clutch to said driven shaft, torque responsive control means subjected to the torque in said low and intermediate drives and operable in response to such torque to control engagement of said high speed clutch, and control means connected to and actuated by said low speed drive for closing said friction clutch, said control means being operable after a predetermined maximum travel of the vehicle by said low speed drive to apply a gradually increasing yielding clutch-closing force to said friction clutch.

17. An automotive transmission as defined in claim 16 in which said control means acts to follow said increasing yielding force with the application of a positive clutch closing force to said friction clutch.

18. An automatic transmission comprising, in combination, driving and driven shafts, low and high speed clutches adapted to be closed in succession, said clutches having low speed and high speed transmission elements respectively constituting the power output elements of said clutches, a counter-shaft geared to the output element of said low speed clutch for rotation thereby at a reduced speed, a manually operable gear-shift member, selective gearing means connectible between said counter-shaft and said driven shaft including shiftable selecting means operable by said gear-shift member to establish selectively between said counter-shaft and said driven shaft a reverse driving connection, a non-over-running intermediate speed forward driving connection, or to establish simultaneously a non-over-running high speed forward driving connection between said high speed transmission member and said driven shaft and an over-running low speed forward driving connection between said counter-shaft and said driven shaft, a second shaft concentric with said counter-shaft and having a geared "auto-second" drive connection with said high speed transmission element of a higher ratio than said low speed over-running drive, a synchronizer clutch for connecting said counter-shaft with said second shaft in driving relation, and a screw and nut device operable by relative rotation of said second shaft and said counter-shaft during operation of said driven shaft through said low speed over-running drive to engage said synchronizer clutch to drive said driven shaft through said higher ratio "auto-second" drive from said second shaft.

19. An automatic transmission comprising, in combination, a driving shaft, a driven shaft, transmission means providing an over-running low speed drive, an intermediate speed drive including a synchronizer, and high speed drive alternatively operable between said shafts, a low speed clutch forming part of said low speed and intermediate speed transmission paths, and a high speed clutch forming part of said high speed transmission path, means operable automatically in response to a running function of an engine to close low speed clutch to render said transmission means effective through said low speed transmission path, control means for said intermediate drive operatively connected to said synchronizer and to said low speed transmission path and operable by said low speed transmission path after closure of said low speed clutch to close said synchronizer and render said transmission means effective through said intermediate ratio transmission path after a predetermined maximum number of revolutions of said driven shaft through said low speed transmission path, said control means comprising a pair of screw and nut devices, one operable rapidly to condition said synchronizer for closure, and the other operable to apply thereafter a gradually increasing yielding closing force to said synchronizer, and means operable automatically in response to a running function of the engine to close said high speed clutch to render said transmission means effective through its high speed transmission path.

20. A transmission having a driving shaft, a driven shaft, and transmission means providing a high speed drive and an over-running low speed drive between said shafts, the combination of an intermediate ratio drive between said shafts including gearing and a synchronizer for rendering said intermediate drive effective, said synchronizer having a conditioning screw and nut device of a relatively high pitch and connected frictionally to said driven shaft to rapidly condition said synchronizer for closure when said driven shaft is actuated through said low speed drive, and a synchronizing screw and nut device of a relatively low pitch and having a positive actuating connection engaged by said conditioning nut and operable to close said synchronizer gradually.

21. A transmission as defined in claim 20 wherein said conditioning device and said synchronizing device are located at opposite ends of said synchronizer.

22. A transmission as defined in claim 20 having abutment means limiting the conditioning movement of said synchronizing screw and nut device.

23. A transmission as defined in claim 20 having abutment means limiting the conditioning movement of said synchronizing screw and nut device, and wherein said synchronizing screw and nut device acts to transmit rotation in said intermediate drive.

24. A transmission as defined in claim 20 having spring means acting compressed by said synchronizing screw and nut device and operable thereby to apply a gradually increasing yielding closing force to said synchronizer.

25. In a power transmission comprising coaxial driving and driven shafts, low and high speed clutches each having driving and driven elements and adapted for closure in succession, a first torque responsive means forming the driving connection between said driving member and the driving element of said clutch, said torque responsive means being operable by high torque to oppose closure of said high speed clutch, a high ratio drive transmitting connection from the driven element of said high speed clutch to said driven shaft, a second torque responsive means forming the driving connection between said driving member of said high speed clutch to the driving member of said low speed clutch, said second torque means being operable by high torque therein to oppose closure of said low speed clutch, and a low ratio drive connection from the driven element of said low speed clutch to said driven shaft, said first torque means being located at a relatively short distance from the axis of said shafts and said second torque means being located at a substantially greater distance from said axis.

26. A power transmission as defined in claim 25 wherein said first torque responsive means constitutes a supporting and centering means for a portion of said high speed clutch and a portion of said low speed clutch.

SIMEON BUDLONG.